Figure 1:
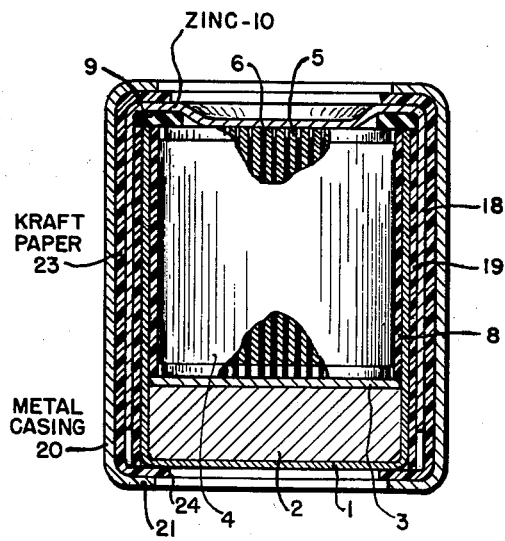

INVENTOR.
GRENVILLE B. ELLIS
BY Harry M. Saragovitz
Attorney

United States Patent Office 2,705,249
Patented Mar. 29, 1955

2,705,249
PRIMARY ALKALINE CELL

Grenville B. Ellis, Red Bank, N. J., assignor to the United States of America as represented by the Secretary of the Army Original application February 10, 1950, Serial No. 143,492. Divided and this application September 5, 1950, Serial No. 183,220

1 Claim. (Cl. 136—107)

(Granted under Title 35, U. S. Code (1952), sec. 266)

This application is a division of application Serial No. 143,492, filed February 10, 1950, under the same name and title, now Patent No. 2,601,267, dated June 24, 1952.

The invention described herein may be manufactured and used by or for the Government for governmental purposes, without the payment of any royalty thereon.

This invention relates to hermetically sealed primary alkaline dry cells of the zinc-potassium hydroxide-mercuric oxide type and more particularly to so-called "button" structures of such alkaline dry cells.

Considerable difficulties with such button cells have been encountered in the hermetic closure structure which is to provide maximum electrical and chemical insulation over a sufficiently long storage period. Recent development has lead to hermetically sealed alkaline dry cells in which the generation of gas within the cell, both on open and closed circuits, has been reduced to such an extent that only traces of gas are being formed which can slowly diffuse out thru or past the resilient sealing means without impairing the cell. Nevertheless, a relatively high percentage of battery failures still occurs, usually after prolonged storage periods, particularly at elevated temperatures, due to the occasional formation of greater amounts of gas and building up of dangerous pressure leading to bulging of the cell container, leakage and creepage of electrolyte and subsequent quick corrosion of the cell.

It is an object of this invention to improve the hermetic closure structure of such button type cells by providing a metallic casing which is insulated from the cell by a layer of insulating, absorbent and alkali resistant material and which incloses the cell in such a way as to greatly improve the storage reliability without impairing the electrical characteristics and ease of manufacturing technique of such cells.

Other objects will become apparent from the following description and claims, taken in connection with the accompanying drawings of a number of preferred embodiments of the invention in its application to known alkaline dry cells comprising essentially an assembly of an open top steel container, a depolarizing cathode in the bottom thereof, a barrier over said cathode, an anode structure on top of said barrier, an immobilized alkaline electrolyte, a conductive material cover for said container serving as anode terminal, a sealing ring of insulating resilient material between said metal cover and the free edge of said open top steel container, and sealing and clamping means holding said assembly under tight pressure.

Figure 2:
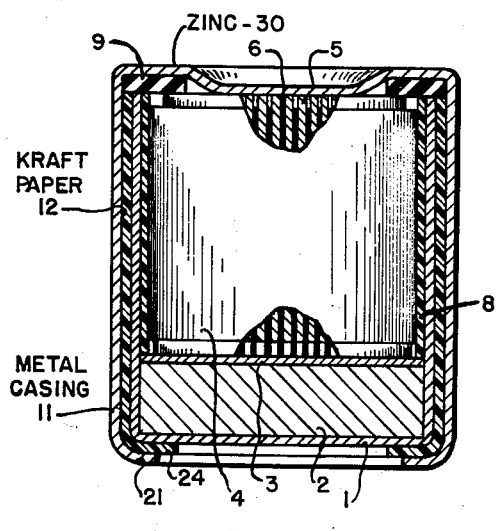

In the drawings:

Figures 1 and 2 show, in central vertical sections, known alkaline dry cells (the anodes being partially in elevation) in combination with two different modifications of metallic casings according to the claimed invention. The same numerals are used thruout the figures to indicate like parts.

The primary cell illustrated in Fig. 1 consists of an open top steel container or can 1, the bottom of which incloses a depolarizing cathode 2 consisting in known manner of an electronically conductive mass of oxygen yielding compounds, such as oxide of silver or mercury, mixed with carbon or graphite. The cathode 2 is separated in known manner by an ionically permeable barrier disc 3 from an anode assembly 4, conventionally comprising a roll of amalgamated zinc foil 5 interwound with a strip of porous electrolyte retaining sheet spacing material 6. A sleeve 8 of polystyrene, lining the side walls of the steel can 1, insulates the anode assembly 4 from the steel can 1. The upper edge of the zinc foil projects at the top and the lower edge of the porous sheet material projects at the bottom of the rolled assembly 4. The conductive metal cover 10 has a depressed central portion which presses against and is in intimate electrical contact with the projecting edge of the zinc foil 5 of the anode assembly 4. A sealing ring 9 of insulating resilient material (e. g., a neoprene washer) is provided between cover 10 and the free edge of the open top steel can 1. The cover 10 which serves as anode terminal may be made of zinc or may consist of an inner layer of zinc, silver, or other metals resistant to alkalies, and an outer layer of steel.

The metal cover 10 forms the bottom of a cylindrical zinc can 18, the cylindrical side walls of which extend downwardly near to the bottom of the seel container 1 and are insulated from the walls of said steel container 1 by layers 19 of insulating material. This arrangement greatly increases the possible leakage or creepage paths of the electrolyte and thus provides additional storage reliability. The entire assembly is hermetically sealed and kept under tight pressure by a metal casing 20 insulated from the steel container 1 by a layer 23 of insulating, absorbent and alkali resistant material. The free end portions 21 and 24 of casing 20 and insulating layer 23 constitute the sealing and clamping means. Since the layer 23 electrically insulates the casing 20 from the zinc can 18, it becomes necessary to provide an opening in the bottom of the casing 20 in order to have free access to the anode terminal formed by the bottom 10 of the zinc can 18.

The cell shown in Fig. 2 illustrates a simplified embodiment of the closure structure according to the present invention. The dry cell itself consists, as the cell in Fig. 1, of a steel container 1, a cathode 2, a barrier 3, and an anode assembly 4. The conductive metal cover 30, however, forms the bottom of a metallic casing 11, the side walls of which extend over the side walls of the steel container 1. A neoprene washer 9 is inserted between cover 10 and the free edges of the steel can 1, and a layer 12 of insulating, absorbent, and alkali resistant material completely insulates the casing 11 from the steel container 1. The free end portions 21 and 24 of said casing 11 and said layer 12 constitute the sealing and clamping means which hermetically seal the cell and keep the assembly under tight pressure. The entire casing 11 may consist of zinc; preferably, the casing may consist of steel or the like, in which case the interior surface of the metal cover 30 (which is in electrical contact with the zinc anode) will be plated with a layer of zinc, silver or other metals resistant to alkalies.

In addition to the advantages already mentioned, the closure structure of the present invention also protects the dry cell from outside shocks, blows, or pressure, and supports the assembly both radially and axially. Alkaline dry cells provided with the improved closure structure have therefore not only a very high storage reliability, but are also mechanically more rigid and less liable to damage in handling and shipping. These advantages are attained with little costs and without interfering with conventional manufacturing techniques.

I claim:

In a hermetically sealed primary alkaline dry cell of the class comprising an assembly of an open top steel container, a depolarizing cathode in the bottom thereof, a barrier over said cathode, an anode-spacer structure on top of said barrier, an immobilized alkaline electrolyte, a steel cover for said container serving as anode terminal, and a sealing ring of insulating resilient material between said cover and the free edge of said open top steel container, characterized in that the interior surface of said steel cover is plated with zinc and in that said zinc plated steel cover constitutes the bottom of a steel casing inclosing said steel container, said steel casing being insulated from said steel container by a layer of insulating, absorbent, and alkali resistant material between said steel casing and said steel container, the end portion of said steel casing and said insulating layer extending water so as to render the technical application of water possible. Therefore, it is of no consequence which hydroxides or salts are employed provided that they are sufficiently water-soluble and neutral, i. e. they must not form stable addition products with the nitrogen compounds to be separated and that they do not undergo reaction with the nitrogen compounds. Especially suitable salts are, for instance, common salt, sodium sulphate, sodium carbonate, sodium phosphate, sodium acetate, sodium formate as well as the corresponding potassium salts and alkali hydroxides, such as sodium and potassium hydroxide. Further substances which may be employed, are described, for instance, in British specification No. 475,818. The said salt solution may contain according to the special requirements only small amounts of the salt or quantities up to saturation. On using alkali hydroxides, solutions containing from about 5% to about 40% of the hydroxide are preferred.

Which of the nitrogen compounds is preferably absorbed depends on the nature of the absorbent applied. Thus, the invention permits of adapting the process to the prevailing conditions of the various absorbents in the single steps of the reaction. On the other hand, it is possible to apply the absorbents in combination in the same step as far as they agree as to their separating activity. For instance, the weak acids may be employed in combination with neutral solvents boiling not substantially lower than the weak acid applied and being indifferent to the weak acid as well as to the nitrogen compounds and yielding homogeneous mixtures with the weak acid. Suitable solvents are for instance o-dichlorobenzene, 1.2.4-trichlorobenzene, nitrobenzene, tetralin, dekalin, higher boiling aliphatic or aromatic hydrocarbons as far as they are still liquid under the reaction conditions applied, as well as higher boiling ethers, alcohols, ketones and polyalcohols.

The application of mixtures of the weak acids with the organic solvents is especially advantageous in the separation of ammonia from mixtures containing methyl amines and in the separation of a mixture consisting of mono- and dimethylamine. Furthermore, it is possible in the separation of trimethylamine from methylamine mixtures being free of ammonia to increase the separating activity of the weak acids by addition of water. Of course, water must not be added in quantities exceeding saturation at the temperatures employed.

The process according to the invention may be advantageously carried out by a continuous method by feeding the reaction mixture, if desired under pressure, in a reaction tower counter-currently to the flow of the absorbent. By appropriately adjusting the flow velocity and the temperature one or more nitrogen compounds are selectively dissolved in the weak acids or in the said other absorbents applied whereas the nitrogen compounds not absorbed escape as vapours at the top of the reaction tower. The absorbed compounds are expelled from the absorbent as described above. By repeating the process once or several times each of the components contained in the starting mixture may be obtained in pure form.

The process herein described is substantially different from that disclosed in German Patent 615,527. German Patent 615,527 comprises the separation of trimethylamine and ammonia by treatment with acids in quantities insufficient for neutralization. The resultant salts cannot be decomposed again by merely heating or by reducing the pressure.

The invention is further illustrated by the following examples, without being restricted thereto.

*Example 1*

A mixture of 62.5% by volume of ammonia and 37.5% by volume of trimethylamine is passed through a liquid mixture of 25% by weight of phenol and 75% by weight of o-dichlorobenzene. At the beginning the mixture is completely absorbed. After saturation of the absorbent a mixture of 90% by volume of ammonia and 10% by volume of trimethylamine escapes. The mixture of ammonia and trimethylamine dissolved in the absorbent is expelled again by heating to 170° C. The mixture consists of 33% by volume of ammonia and 67% by volume of trimethylamine. By repeating the process several times, each of the two components is obtained in pure form.

*Example 2*

A mixture of ammonia and dimethylamine is introduced into a molten mixture of α- and β-naphthol, the proportion of the mixtures being 1:1. After saturation of the naphthol melt at about 90° C. with the bases a gas mixture consisting of 68% by volume of ammonia and 32% by volume of dimethylamine escapes. By repeating the process several times, each of the two components is obtained in pure form.

*Example 3*

400 parts by weight of a solvent mixture consisting of 25% by weight of phenol and 75% by weight of o-dichlorobenzene is saturated with a mixture consisting of 78% by volume of trimethylamine and 22% by volume of ammonia. 108 parts by weight of the mixture are totally absorbed. Thereupon pure trimethylamine is introduced into the saturated solution through a glass frit. The escaping gas mixture consists of 50% by volume each of ammonia and trimethylamine. As soon as the content of ammonia in the escaping gas decreases feeding of pure trimethylamine is stopped. By heating the solution 112 parts by weight of a 96.5% trimethylamine are obtained.

*Example 4*

M-cresol and a gas mixture of approximately equal parts by volume of ammonia, dimethylamine, and trimethylamine are contacted in countercurrent in an absorption tower packed with Raschig rings, said absorption tower having a length of 2.50 m. and a diameter of 3 cm. 45 liters of the aforesaid mixture and 120 grams of m-cresol are charged each hour. The gas escaping at the top of the tower consists of 99% ammonia whereas the mixture of methylamines expelled from the absorbent is almost free from ammonia.

*Example 5*

The mixture of dimethylamine and trimethylamine set free on heating the sump obtained according to Example 4 is contacted with m-cresol in an absorption tower as indicated in Example 4. About 48 liters of the mixture of the methylamines and 90 grams of m-cresol are charged each hour. 98% trimethylamine escapes at the top of the reaction tower whereas a 90% dimethylamine is obtained by heating the sump solution.

*Example 6*

A mixture consisting of 55% by volume of ammonia, 15% by volume each of mono-, di-, and trimethylamine is contacted in countercurrent with a technical cresol mixture (30 grams per hour) in an absorption tower packed with Raschig rings, said absorption tower having a diameter of 25 mm. and a height of 2.50 m.; the throughput of said mixture amounts to 30 liters per hour. The non-absorbed gas contains 100% of the amount of ammonia charged and 95% of the trimethylamine charged and is free from mono- and dimethylamine.

The mixture absorbed by the cresol and containing besides small amounts of trimethylamine, the whole mono- and dimethylamine is contacted after expelling from the solvent with a mixture consisting of 1 part by weight of phenol and 3 parts by weight of o-dichlorobenzene in the same reaction tower and in similar manner.

100% monomethylamine escapes at the top of the reaction tower whereas 92% dimethylamine is obtained from the sump solution.

*Example 7*

A mixture of 49% by volume of ammonia and 17% by volume each of mono-, di-, and trimethylamine at a rate of 29 liters per hour is contacted, in countercurrent, at room temperature with a caustic soda solution of 10% strength in an absorption tower packed with Raschig rings and having a height of 2.50 m. and a diameter of 25 mm. The gas mixture is fed at a point in the middle of the tower, the sump of the absorption tower is heated to 45° C. When charging 70 cm.³ of caustic soda solution per hour 100% trimethylamine is taken off from the top of the tower. The dissolved nitrogen compounds are practically free from trimethylamine.

The dissolved mixture of nitrogen compounds is expelled by heating and contacted in a similarly constructed tower with a technical cresol mixture of such an amount that the mono- and dimethylamine contained in the mixture are dissolved whereas pure ammonia escapes at the top of the tower.